(12) United States Patent
Arslan et al.

(10) Patent No.: US 12,505,343 B2
(45) Date of Patent: Dec. 23, 2025

(54) METHOD AND APPARATUS FOR IMAGE RECOGNITION USING DUAL-SUBNETWORK ARCHITECTURE

(71) Applicants: Sony Semiconductor Solutions Corporation, Kanagawa (JP); Politechnico di Torino, Turin (IT)

(72) Inventors: Ali Arslan, Kanagawa (JP); Matteo Testa, Kanagawa (JP); Lev Markhasin, Kanagawa (JP); Tiziano Bianchi, Kanagawa (JP); Enrico Magli, Kanagawa (JP)

(73) Assignees: Sony Semiconductor Solutions Corporation, Kanagawa (JP); Politechnico di Torino, Turin (IT)

( * ) Notice: Subject to any disclaimer, the term of this patent is extended or adjusted under 35 U.S.C. 154(b) by 975 days.

(21) Appl. No.: 17/376,195

(22) Filed: Jul. 15, 2021

(65) Prior Publication Data

US 2022/0027732 A1    Jan. 27, 2022

(30) Foreign Application Priority Data

Jul. 24, 2020   (EP) .................................... 20187576

(51) Int. Cl.
*G06N 3/08*          (2023.01)
*G06F 18/2132*       (2023.01)
*G06F 18/22*         (2023.01)
*G06N 3/045*         (2023.01)

(52) U.S. Cl.
CPC ........... *G06N 3/08* (2013.01); *G06F 18/2132* (2023.01); *G06F 18/22* (2023.01); *G06N 3/045* (2023.01)

(58) Field of Classification Search
CPC .......... G06N 3/08; G06N 3/045; G06N 3/047; G06N 3/084; G06F 18/2132; G06F 18/22; G06V 10/761; G06V 10/764; G06V 40/172; G06V 40/1365
See application file for complete search history.

(56) References Cited

FOREIGN PATENT DOCUMENTS

KR         102036957 B1 * 10/2016
WO      WO-2021147366 A1 *  7/2021 ............. G06N 20/00

OTHER PUBLICATIONS

Face Verification Using Convolutional Neural Networks with Siamese Architecture, Zuzana Bukovciková et al., Research Gate Sep. 2017 DOI: 10.23919/ELMAR.2017.8124469 (Year: 2017).*

(Continued)

*Primary Examiner* — Li Wu Chang
(74) *Attorney, Agent, or Firm* — XSENSUS LLP

(57) ABSTRACT

The present disclosure relates to an apparatus for image recognition. The apparatus comprises a machine learning network configured to map first and second input image data to either a first or a second predefined target probability distribution, depending on whether the first and second input image data correspond to matching or non-matching images, wherein an output of the machine learning network matching the first target probability distribution is indicative of matching images and an output of the machine learning network matching the second target probability distribution is indicative of non-matching images. The present disclosure also relates to a method for training the apparatus for image recognition.

8 Claims, 4 Drawing Sheets

(56) References Cited

OTHER PUBLICATIONS

Deep Metric Learning for Practical Person Re-Identification, Dong Yi et al., arXiv:1407.4979v1 [cs.CV] Jul. 18, 2014 (Year: 2014).*
The History Began from AlexNet: A Comprehensive Survey on Deep Learning Approaches, Md Zahangir Alom et al. , https://doi.org/10.48550/arXiv.1803.01164 (Year: 2018).*
Audio-Based Semantic Concept Classification for Consumer Video, Keansub Lee, IEEE Transactions on Audio, Speech, and Language Processing, vol. 18, No. 6, Aug. 2010 (Year: 2010).*
Deep Face Recognition, Parkhi et al., Proceedings of the British Machine Vision Conference 2015 Discloses relevant information regarding facial recognition technologies, specifically CNNs, their training and validation. (Year: 2015).*
Siamese Neural Networks for One-shot Image Recognition, Gregory Koch et al., Proceedings of the 32nd International Conference on Machine Learning, Lille, France, 2015 (Year: 2015).*
Visual fingerprinting for lobsters using deep learning, Mae L. Seto, 2019 IEEE International Conference on Systems, Man and Cybernetics (SMC) Bari, Italy. Oct. 6-9, 2019 (Year: 2019).*
Learning Local Matching with Hard Sample Mining for Person Re-identification, Yumin Suh, https://s-space.snu.ac.kr/handle/10371/151855 (Year: 2019).*
FaceNet: A Unified Embedding for Face Recognition and Clustering, Florian Schoff et al., Proceedings of the IEEE Conference on Computer Vision and Pattern Recognition (CVPR), 2015, pp. 815-823 (Year: 2015).*
End-to-End Incremental Learning, Francisco M. Castro et al., arXiv:1807.09536v2 [cs.CV] Sep. 3, 2018 (Year: 2018).*
Training Region-based Object Detectors with Online Hard Example Mining, Shrivastava et al., Proceedings of the IEEE Conference on Computer Vision and Pattern Recognition (CVPR), 2016, pp. 761-769 (Year: 2016).*
Dong Yi et al: "Deep Metric Learning for Practical Person ReIdentification", ARXIV 1407.4979v1, Jul. 18, 2014 (Jul. 18, 2014), pp. 1-11, XP055279061, Journal of Latex Class Files, vol. 11, No. 4, Dec. 2012.
Guo Zhenning: "Distributed Machine Learning over Directed Network with Fixed Communication Delays", Machine Learning and Computing, ACM, Feb. 22, 2019 (Feb. 22, 2019), pp. 22-26, XP058435668, DOI: 10.1145/3318299.3318340, ISBN: 978-1-4503-6600-7.
Testa Matteo et al: "Learning mappings onto regularized latent spaces for biometric authentication", 2019 IEEE 21st International Workshop on Multimedia Signal Processing (MMSP), IEEE, Sep. 27, 2019 (Sep. 27, 2019), pp. 1-6, XP033660020, DOI: 10.1109/MMSP.2019.8901698 [retrieved on Nov. 14, 2019].
Bukovcikova Zuzana et al: "Face verification using convolutional neural networks with Siamese architecture", 2017 International Symposium Elmar, Croatian Society Electronics in Marine—Elmar, Sep. 18, 2017 (Sep. 18, 2017), pp. 205-208, XP033272761, DOI: 10.23919/ELMAR.2017.8124469 [retrieved on Nov. 29, 2017].
Arslan Ali et al: "BioMetricNet: deep unconstrained face verification through learning of metrics regularized onto Gaussian distributions", arxiv.org, Cornell University Library, 201OLIN Library Cornell University Ithaca, NY14853,Aug. 13, 2020 (Aug. 13, 2020), XP081740191.
Brilli Stefano: "BiometricNet—A deep learning-based approach for biometric authentication", Master's Degree Thesis, Jul. 28, 2020 (Jul. 28, 2020), XP055864304, Torino, Italy Retrieved from the Internet: URL:https://webthesis.biblio.polito.it/15331/1/tesi.pdf [retrieved on Nov. 22, 2021].
Diederik P Kingma et al: "Auto-Encoding Variational Bayes", Dec. 20, 2013 (Dec. 20, 2013), XP055452075, Retrieved from the Internet: URL:https://arxiv.0rg/pdf/1312.6114.pdf [retrieved on Feb. 16, 2018].
Extended European Search Report issued Dec. 3, 2021, in European Patent Application 21185682.8.
Wen et al., "A Discriminative Feature Learning Approach for Deep Face Recognition", Springer International Publishing AG, 2016, pp. 499-515.
Wang et al., "Additive Margin Softmax for Face Verification", Available Online At: https://github.com/happynear/AMSoftmax, Workshop track—ICLR, 2018, pp. 1-9.
Deng et al., "ArcFace: Additive Angular Margin Loss for Deep Face Recognition", arXiv:1801.07698v3, Available Online At: https://github.com/deepinsight/insightface, Feb. 9, 2019, 11 pages.
"BioMetricNet: Deep Unconstrained Face Recognition Through Regularized Learning of Mappings Onto Target Distibutions in Latent Space", Anonymous CVPR submission, 2019, pp. 1-10.
Sun et al., "Deep Learning Face Representation by Joint Identification-Verification", NIPS'14: Proceedings of the 27th International Conference on Neural Information Processing Systems—vol. 2, Dec. 2014, pp. 1988-1996.
Sun et al., "DeepID3: Face Recognition with Very Deep Neural Networks", arXiv:1502.00873v1, Feb. 3, 2015, pp. 1-5.
Sun et al., "Deeply Learned Face Representations are Sparse, Selective, and Robust", arXiv:1412.1265v1, Dec. 3, 2014, pp. 1-12.
Qi et al., "Face Recognition via Centralized Coordinate Learning", arXiv:1801.05678v1, Jan. 17, 2018, pp. 1-14.
Schroff et al., "FaceNet: A Unified Embedding for Face Recognition and Clustering", arXiv:1503.03832v3, Jun. 17, 2015, 10 pages.
Hasnat et al., "DeepVisage: Making Face Recognition Simple Yet With Powerful Generalization Skills", Computer Vision Foundation, Mar. 2017, pp. 1682-1691.
Ranjan et al., "L2-constrained Softmax Loss for Discriminative Face Verification", arXiv:1703.09507v3, Jun. 7, 2017, 10 pages.
Liu et al., "Large-Margin Softmax Loss for Convolutional Neural Networks Weiyang", Proceedings of the 33 rd International Conference on Machine Learning, MLR: W&CP, vol. 48, arXiv:1612.02295v4, Nov. 17, 2017, 10 pages.
Liu et al., "SphereFace: Deep Hypersphere Embedding for Face Recognition", Computer Vision Foundation, 2017, pp. 213-220.
Wang et al., "NormFace: L2 Hypersphere Embedding for Face Verification", arXiv:1704.06369v4, Jul. 26, 2017, 11 pages.
Liu et al., "Rethinking Feature Discrimination and Polymerization for Large-scale Recognition", 31st Conference on Neural Information Processing Systems (NIPS 2017) Deep Learning Workshop, arXiv: 1710.00870v2, Oct. 29, 2017, pp. 1-13.
Wang et al., "CosFace: Large Margin Cosine Loss for Deep Face Recognition", Computer Vision Foundation, Jan. 2018, pp. 5265-5274.

\* cited by examiner

METHOD AND APPARATUS FOR IMAGE RECOGNITION USING DUAL-SUBNETWORK ARCHITECTURE

CROSS-REFERENCE TO RELATED APPLICATION

The present application claims priority to EP 20187576.2, filed Jul. 24, 2020, the entire contents of which is incorporated herein by reference.

FIELD

The present disclosure relates to methods and apparatuses for image recognition and, more particularly, to methods and apparatuses for face or fingerprint recognition, for example.

BACKGROUND

Over the last years, huge progresses have been made in the deep learning community. Advances in the development of Convolutional Neural Networks (CNN) have led to unprecedented accuracy in many computer vision tasks. One of the tasks which has attracted computer vision researchers since its inception is that of being able to recognize a person from a picture of his/her face. This task, which has countless applications, is still far to be marked as a solved problem. One of the most interesting sub-tasks is face recognition.

Given two (properly aligned) input face images, a goal is to make a decision whether they represent the same person or not. Early attempts in the field required the design of hand-crafted features which could capture the most significant traits whose values are unique to each person. Furthermore, they had to be computed from precisely aligned and illumination normalized pictures. It had become evident the complexity of handling the non-linear variations which may occur in face images. Thus, it is not surprising that many conventional methods tend to fail in non-ideal conditions.

A breakthrough in performance was made possible by means of learned features through CNN-based networks. As in previous methods, once the features of two test faces have been computed, a distance measure (typically $\ell 2$) is employed for the recognition task: if the distance is below a certain threshold, the two test faces belong to the same person, otherwise not. A loss employed to compute such features may be the softmax cross-entropy, which eventually showed its limitations. It was found that generalization ability could be improved by maximizing inter-class variance and minimizing intra-class variance, wherein intra-class relates to matching image pairs and inter-class relates to non-matching image pairs. This strategy was adopted by accounting for a large margin, in the Euclidean space, between "contrastive" embeddings, hence the term contrastive loss. A further advancement was then the introduction of the so-called triplet-loss: here, the distance between the embeddings is evaluated in relative rather than absolute terms. The introduction of anchor samples in the training process allows to learn embeddings for which the anchor-positive distance is minimized and anchor-negative is maximized. Even though this has led to better embedding representations, it has been shown that it is, oftentimes, complex to train. The focus eventually shifted to the design of new architectures employing metrics other than $\ell 2$ to provide more strict margins. As a matter of fact, not so strict margins can easily lead to false positive outcomes.

Angular distance metrics have been proposed to enforce a large margin between negative examples and thus reduce the number of false positives. It was shown that angular-based loss, in contrast to $\ell 2$-based losses, enforces discriminative constraints on a hypersphere manifold, accounting for the fact that human faces lie on manifold in a larger space.

In all of the above-mentioned methods, a pre-determined analytical metric is used to compute the distance between two embeddings. Then, the loss function is designed in order to ensure a large margin (in terms of the employed metric) between the features of negative couples and compacting the positive ones. The loss functions mostly focus on the separability of the facial/fingerprint features, however, the decision boundaries are complex and arbitrary which leads to potential errors.

Thus, there is a need for improvement for machine learning based decisions on matching or non-matching image pairs.

SUMMARY

Embodiments of the present disclosure address the objective by mapping matching and non-matching image pairs to predefined statistical distributions that can be easily separated.

According to a first aspect of the present disclosure, it is provided an apparatus for image recognition. The apparatus comprises a machine learning network configured to map first and second input image data to either a first or a second predefined target probability distribution, depending on whether the first and second input image data correspond to matching or non-matching images. An output of the machine learning network matching the first target probability distribution is indicative of matching images and an output of the machine learning network matching the second target probability distribution is indicative of non-matching images.

According to some embodiments, the first and the second target probability distribution correspond to a first and a second multivariate Gaussian distribution with distinct centers of mass. The first and the second target probability distribution may be chosen to be Gaussian since the output of some machine learning networks naturally tends to this distribution because of the central limit theorem.

According to some embodiments, the machine learning network comprises a first machine learning subnetwork configured to extract respective discriminative image features from the first and second image data, and a second machine learning subnetwork configured to map the extracted first and second discriminative image features to one of the first and second predefined target probability distributions.

According to some embodiments, the first machine learning subnetwork comprises a Siamese neural network configured to process the first and second image data in tandem to compute the first and second discriminative image features.

According to some embodiments, the second machine learning subnetwork comprises a convolutional neural network comprising an input layer for the first and second discriminative image features, a plurality of fully connected layers to apply a previously trained metric on the first and second discriminative image features, and an output layer for an m-dimensional output.

According to some embodiments, the apparatus further comprises a preprocessor configured to preprocess the first and second input image data for alignment of corresponding first and second images based on a plurality of predefined image points. This may improve the comparability of the first and second images.

According to a further aspect of the present disclosure, it is provided method for training the apparatus of any one of the previous claims. The training method includes feeding image data of pairs of matching or non-matching images into the machine learning network, adjusting computational weights of the machine learning network to minimize a difference between the predefined target probability distributions and statistics of outputs generated by the machine learning network.

According to some embodiments, adjusting the computational weights comprises minimizing a difference between the first predefined target probability distribution and a distribution of outputs of the machine learning network in response to pairs of matching images, and minimizing a difference between the second predefined target probability distribution and a distribution of outputs of the machine learning network in response to pairs of non-matching images.

According to some embodiments, adjusting the computational weights comprises minimizing the Kullback-Leibler divergence between the target probability distributions and the statistics of outputs.

Hence, embodiments comprise a training device and an authentication device. The training device is used to train the matching and non-matching pairs on regularized predefined distributions. The authentication device uses the network weights computed by the training device.

According to yet a further aspect of the present disclosure, it is provided method for image recognition. The method includes mapping, using a machine learning network, first and second input image data to either a first or a second predefined target probability distribution, depending on whether the first and second input image data correspond to matching or non-matching images, and deciding for matching images if an output of the machine learning network matches the first target probability distribution or deciding for non-matching images if the output of the machine learning network matches the second target probability distribution.

Embodiments of the present disclosure propose not only to learn the most discriminative features (first machine learning subnetwork), but also to jointly learn the best (possibly highly non-linear) metric to compare such features (second machine learning sub-network). The only requirement is on how the metric should behave depending whether the features are those coming from positive (matching) or negative (non-matching) image pairs. In other words, the metric outcome is regularized to be distributed accordingly to two different distributions: one for positive and one for negative input samples.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
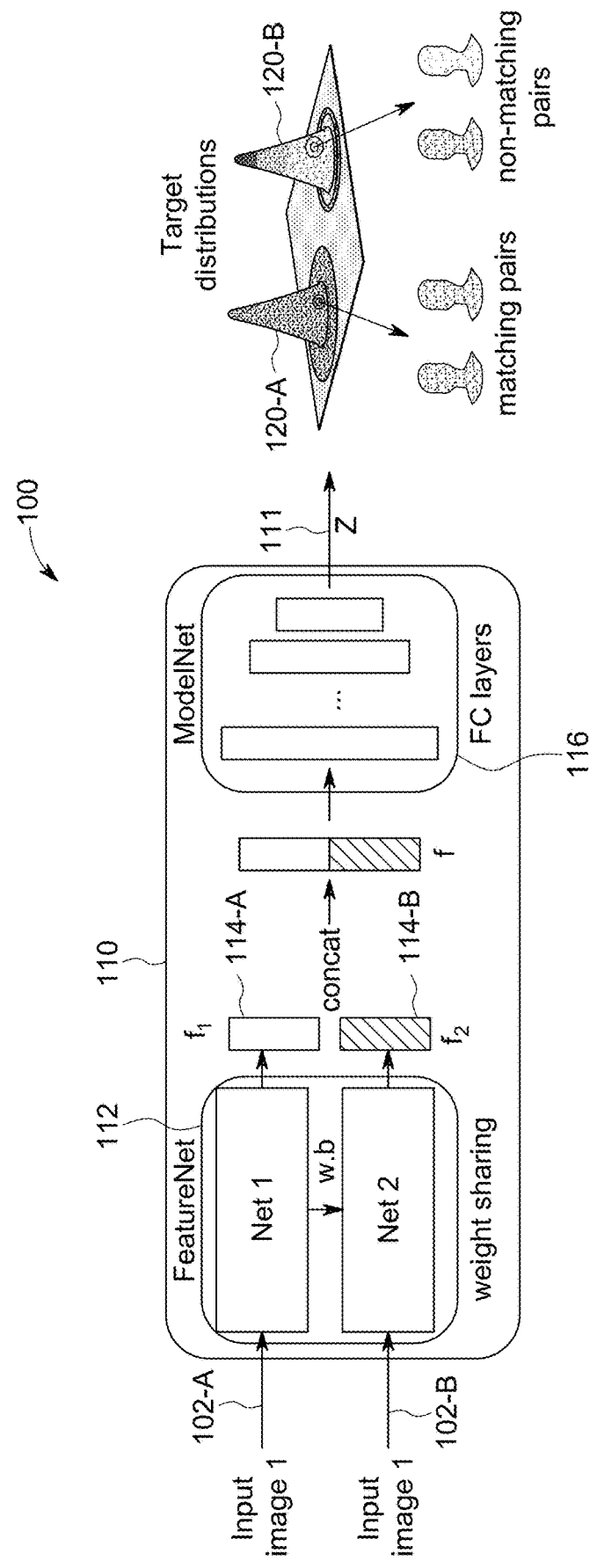
FIG. 1 shows an embodiment of an apparatus for image recognition.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Embodiments of the present disclosure propose to learn meaningful features of input images along with a discriminative metric to be used to compare image features of pairs of input images, such as facial or fingerprint images, for example. Well-known literature approaches fix an analytical metric to compare e.g. facial features and use the loss to ensure that the resulting distances are well separated in case of non-matching image pairs. Embodiments of the present disclosure are different and add an additional degree of freedom. A constraint that is imposed through the loss function is to have a well-behaved latent space, i.e. the metric space, such that similar images (e.g. related to similar faces) are compacted while dissimilar images are pushed far apart.

FIG. 1 illustrates an apparatus 100 for image recognition according to an embodiment of the present disclosure. Apparatus 100 can be employed for detecting matching or non-matching pairs of images, such as matching or non-matching pairs of face images (i.e., images showing the same person) or matching or non-matching pairs of fingerprint images (i.e., images showing the same fingerprint), for example. Further applications are conceivable as well.

Apparatus 100 comprises at least one machine learning network 110 which is configured to map first input image data 102-A and second input image data 102-B to either a first predefined target probability distribution 120-A or a second predefined target probability distribution 120-B, depending on whether the first and second input image data 102-A, 102-B correspond to matching or non-matching images. The first and second input image data 102-A, 102-B correspond to a digital representation of first and second images, respectively. Preferably, apparatus 100 further comprises a preprocessor (not shown) which is configured to preprocess the first and second input image data 102-A, 102-B in order to align the corresponding first and second images based on a plurality of predefined image points. An output 111 of the machine learning network 110 matching the first target probability distribution 120-A is indicative of matching images (i.e., images showing the same person or fingerprint) and an output 111 of the machine learning network 110 matching the second target probability distribution 120-B is indicative of non-matching images (i.e., images showing different persons or fingerprints).

According to an embodiment, machine learning network 110 may comprise two sub-networks: a first machine learning subnetwork 112 (FeatureNet) which is configured to determine respective discriminative image features 114-A, 114-B (to be trained) from the first and second image data 102-A, 102-B, and a second machine learning subnetwork 116 (ModelNet) which is configured to map the determined first and second discriminative image features 114-A, 114-B to one of the first and second predefined target probability distributions 120-A, 120-B.

According to an embodiment, FeatureNet 112 may be a Siamese neural network which processes pairs of input images 102-A, 102-B and outputs a pair of image feature vectors 114-A, 114-B. Thus, FeatureNet 112 may extract the discriminative image features (e.g. face or fingerprint features) from the image space into a d-dimensional feature vector space. ModelNet 116 may be chosen as a convolutional neural network comprising an input layer for the first and second discriminative image features 114-A, 114-B, a plurality of fully connected layers to apply a metric (to be trained) on the first and second discriminative image features 114-A, 114-B, and an output layer for an m-dimensional output. Hence, ModelNet 116, given the image feature vector pairs 114-A, 114-B, may apply the learned metric and output a distance which is shaped through the loss function. According to embodiments, the two sub-networks 112, 116 may be trained as a single entity to match the desired behavior.

One strategy is based on selecting matching image pairs (intra-class users) and non-matching image pairs (inter-class users) during the training phase, and mapping them to clearly separated and well-behaved Gaussian probability distributions 120-A, 120-B. This has been shown to lead to a good separation between positive and negative samples. The skilled person will appreciate, however, that also other predefined target probability distributions 120-A, 120-B are in principle possible, such as multivariate Laplacian distributions, for example. The choice of the predefined target probability distributions 120-A, 120-B may depend on the network structure of ModelNet 116.

More specifically, FeatureNet 112 takes as input the pairs of the (face) images, namely matching pairs (positive examples) as well as a non-matching pairs (negative example). The loss function should be made in such a way that the learnt metric of ModelNet 116, when comparing positive examples should output samples following a first target probability distribution $\mathbb{P}_m$. Similarly, the output of the metric when comparing the negative examples should follow a second target probability distribution $\mathbb{P}_n$. Since both target probability distributions 120-A, 120-B may be chosen at design phase to have far-enough mass centers, it becomes easy to draw a hyperplane separating the two classes.

The desired target probability distributions $\mathbb{P}_m$ and $\mathbb{P}_n$ (for matching and non-matching pairs respectively) may be defined as two multivariate Gaussian distributions over a d-dimensional space:

$$\mathbb{P}_m = \mathcal{N}(\mu_{T_m}, \Sigma_{T_m}), \mathcal{N}_n = \mathbb{P}(\mu_{T_n}, \Sigma_{T_n})$$

where $$\Sigma_{T_m} = \sigma_{T_m}^2 \mathbb{I}_d$$

And $$\Sigma_{T_n} = \sigma_{T_n}^2 \mathbb{I}_d$$

may be defined as diagonal covariance matrices and $$\mu_{T_m} = \mu_{T_m} 1_T,$$

$$\mu_{T_n} = \mu_{T_n} 1_T$$

may be the mean vectors. The predefined target probability distributions 120-A, 120-B may be chosen to be Gaussian since the output of fully connected layers of ModelNet 116 naturally tends to this distribution because of the central limit theorem. Further, independence of the variables in the d-dimensional space may be assumed to simplify the problem.

$\hat{x}_m$ and $\hat{x}_n$ may be defined as the pairs of matching and non-matching (face) images 102-A, 102-B, respectively. A goal of the machine learning network 110 (including the subnetworks 112, 116) is to learn an encoding function of the input pairs $z = H(\hat{x})$, where $\hat{x} \in \{\hat{x}_m, \hat{x}_n\}$ such that $z \sim \mathbb{P}_m$ if $\hat{x} = \hat{x}_m$ and $z \sim \mathbb{P}_n$ if $\hat{x} = \hat{x}_n$. In order to enforce the metric output 111, namely z, to follow the intended predefined target probability distributions 120-A, 120-B, a similarity measure between distributions may be defined. Adjusting the computational weights of the machine learning network 110 (including the subnetworks 112, 116) may thus comprise minimizing a difference (maximizing the similarity) between the first predefined target probability distribution $\mathbb{P}_m$ and a distribution of outputs z of the machine learning network in response to pairs of matching images 102-A, 102-B, and minimizing a difference between the second predefined target probability distribution $\mathbb{P}_n$ and a distribution of outputs z of the machine learning network in response to pairs of non-matching images 102-A, 102-B.

Some embodiments may rely on the Kullback-Leibler (KL) divergence which, under the assumption that the imposed target probability distributions 120-A, 120-B as well as the network output 111 follow a Gaussian distribution, allows to obtain a closed-form loss function. A loss function is a function that maps an event or values of one or more variables onto a real number intuitively representing some "cost" associated with the event. Adjusting the computational weights of the machine learning network 110 seeks to minimize an adequate loss function.

Due to the above assumptions on the network output 111, we are interested in the statistics of z, for example of first and second order. For this reason, let us recall that during training the machine learning network 110 may be given as input a batch of biometric traits $X \in \mathbb{R}^{b \times n}$ with b being the batch size, thus resulting in $Z \in \mathbb{R}^{b \times d}$ after the encoding. Therefore, we can compute the first and second order statistics (over a batch) of the encoded representations $Z_m$, $Z_n$ related to matching $(\mu_{O_m}, \Sigma_{O_m})$ and non-matching $(\mu_{O_n}, \Sigma_{O_n})$ input biometric traits respectively. More specifically, we have that $\mu_{O_m}^{(i)} = \mathbb{E}[Z_m^{(i)}]$ and $\Sigma_{O_m}^{(ii)} = \text{var}(\Sigma_m^{(i)})$ where $^{(i)}$ denotes the i-th column and $^{(ii)}$ the i-th diagonal entry.

Having defined the statistics of both target and encoded samples distributions, the KL divergence for multivariate Gaussian distributions (in case of matching input faces) can be written as:

$$\mathcal{L}_m = \frac{1}{2}\left[\log\frac{|\Sigma_{T_m}|}{|\Sigma_{O_m}|} - d + tr\left(\Sigma_{T_m}^{-1}\Sigma_{O_m}\right) + +(\mu_{T_m}-\mu_{O_m})^T\Sigma_{T_m}^{-1}(\mu_{T_m}-\mu_{O_m})\right],$$

where pedix T indicates the target (desired) statistics.

More specifically, based on the assumption of independence of the components of the d-dimensional latent representation, the target covariance matrices $\Sigma_{T_m}, \Sigma_{T_n}$ may be defined to be diagonal. On the same line, all the variables may be defined to have the same mean, e.g., $\mu_{T_m} = 1^d \mu_{T_m}$ and $\mu_{T_n} = 1^d \mu_{T_n}$.

For the case of diagonal covariance matrices, $\mathcal{L}_m$ can be rewritten as $$\mathcal{L}_m = \frac{1}{2}\left[\log\frac{\sigma_{T_m}^{2d}}{\prod_i \Sigma_{O_m}^{(ii)}} - d + \frac{\sum_i \Sigma_{O_m}^{(ii)}}{\sigma_{T_m}^2} + \frac{\|\mu_{T_m}-\mu_{O_m}\|_2}{\sigma_{T_m}^2}\right].$$

In a similar fashion $\mathcal{L}_n$ can be obtained by considering the statistics of both target and encoded distributions in the case of unauthorized input biometric traits. Then, the loss function which the machine learning network 110 has to minimize may be given by $\mathcal{L} = 1/2\mathcal{L}_m + 1/2\mathcal{L}_n$, which reaches its minimum when the statistics of the two generated output distributions will match that of the target probability distributions 120-A, 120-B. Note that the distribution of the encoded samples is shaped by only enforcing first and second order statistics. It has been observed that these statistics are sufficient to shape the encoded samples distributions to closely follow the target ones. This leads to conjecture that the encoder output 111 tends to a maximum entropy distribution (Gaussian) and thus first and secand order moments are sufficient to shape the latent space as intended.

For face recognition most common and well-performing loss functions include large margin feature-based learning loss used by Arcface (Jiankang Deng, Jia Guo, Niannan Xue, and Stefanos Zafeiriou. Arcface: Additive angular margin loss for deep face recognition. In Proceedings of the IEEE Conference on Computer Vision and Pattern Recognition, pages 4690-4699, 2019), Cosface (Hao Wang, Yitong Wang, Zheng Zhou, Xing Ji, Dihong Gong, Jingchao Zhou, Zhifeng Li, and Wei Liu. Cosface: Large margin cosine loss for deep face recognition. In Proceedings of the IEEE Conference on Computer Vision and Pattern Recognition, pages 5265-5274, 2018), and Sphereface (Weiyang Liu, Yandong Wen, Zhiding Yu, Ming Li, Bhiksha Raj, and Le Song. Sphereface: Deep hypersphere embedding for face recognition. In Proceedings of the IEEE conference on computer vision and pattern recognition, pages 212-220, 2017), which is based on angular margin compactness, Euclidean distance-based loss including contractive loss, center loss and Triplet loss used by FaceNet (Florian Schroff, Dmitry Kalenichenko, and James Philbin. Facenet: A unified embedding for face recognition and clustering. In Proceedings of the IEEE conference on computer vision and pattern recognition, pages 815-823, 2015), VGGFace (Omkar M Parkhi, Andrea Vedaldi, Andrew Zisserman, et al. Deep face recognition. In bmvc, volume 1, page 6, 2015), and DeepID3 (Yi Sun, Ding Liang, Xiaogang Wang, and Xiaoou Tang. Deepid3: Face recognition with very deep neural networks. arXiv preprint arXiv: 1502.00873, 2015). All of these losses are based on interclass discrepancy and intraclass compactness either in Euclidean or angular space. As previously hinted, it becomes clear how all the available methods rely on known and predefined metrics in order to assess the features distance.

The present disclosure approaches the problem from a different perspective by regularizing the metric space to well-behaved target probability distributions 120-A, 120-B. In the it will be shown how the proposed loss function significantly outperforms all other loss functions across different datasets. This allows to establish the superiority of the metric space regularization approach as it leads to improved performance for the face recognition task.

For fast convergence, machine learning network 110 may select the most difficult matching and non-matching pairs. Only those pairs may be selected, which fall onto the low probability regions of the target probability distributions 120-A, 120-B. A rationale behind this choice is that the machine learning network 110 will naturally tend to put the most difficult samples in the so-called confusion region, namely where the tails of the two distributions 120-A, 120-B intersect. The goal of the machine learning network 110 is to map $Z_m$ to $\mathbb{P}_m$ and $Z_n$ to $\mathbb{P}_n$. Thus, the hard matching and non-matching pairs may be selected within the mini-batches while online training: after every epoch the subset of matching pairs may be selected whose output $Z_m$ is far from the mass center of $\mathbb{P}_m$. Similarly, for the non-matching pairs, those may be selected which result in a $Z_n$ far from the center of mass of $\mathbb{P}_n$. The result is that during the following epoch, the machine learning network 110 will improve as it will be given as input more and more challenging samples.

No strict thresholds are necessary in order to perform such selection as it will highly decrease the number of pairs. In turn, first and second-order statistics computed over a too small mini-batch may result in less statically significant values. More in detail, 720 people per batch may be selected, each of them having at least 5 different images. This is done to have enough matching and non-matching pairs after the pairs selection step.

Figure 2:
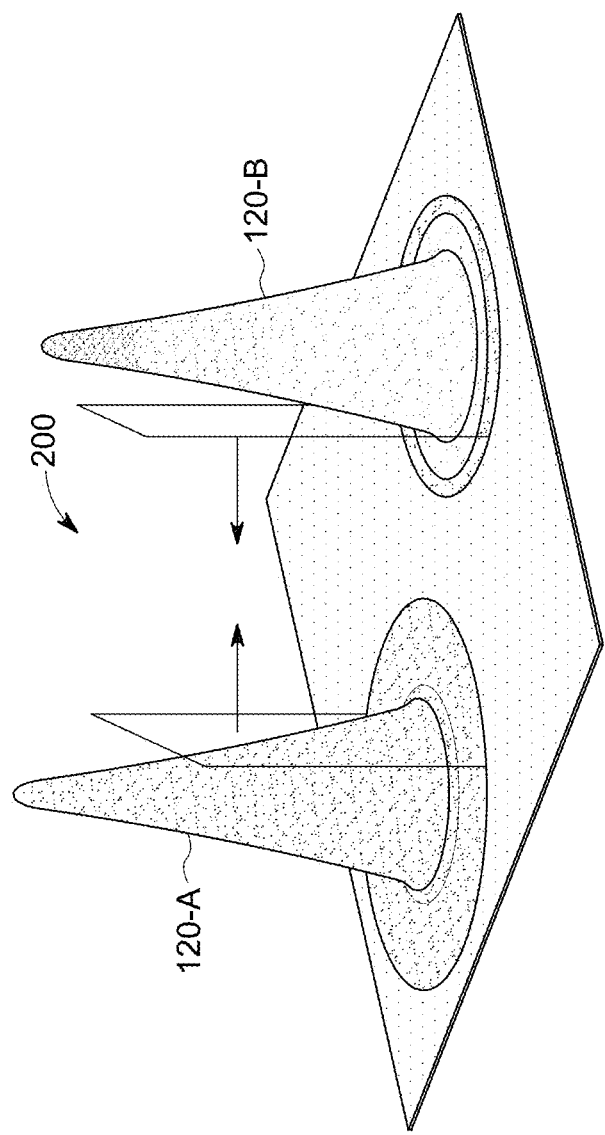
FIG. 2 shows first and the second target probability distributions for the matching and non-matching image pairs.

FIG. 2 depicts how the most difficult matching and nonmatching pairs 102-A, 102-B may be selected. For fast convergence, machine learning network 110 may select the hard matching and non-matching pairs. $\mathbb{P}_m$ 120-A represents the target distribution for the matching pairs, and $\mathbb{P}_n$ 120-B represents depicts the target distribution for the nonmatching pairs. A subset 200 of $Z_m$ and $Z_n$ which are not mapped to $\mathbb{P}_m$ and $\mathbb{P}_n$ respectively may be selected in the mini-batches for training.

The datasets that may be employed for training machine learning network 110 are Casia (Dong Yi, Zhen Lei, Shengcai Liao, and Stan Z Li. Learning face representation from scratch. arXiv preprintarXiv: 1411.7923, 2014), VGG-Face2 (Qiong Cao, Li Shen, Weidi Xie, Omkar M Parkhi, and Andrew Zisserman. Vggface2: A dataset for recognizing faces across pose and age. In 2018 13th IEEE International Conference on Automatic Face & Gesture Recognition (FG 2018), pages 67-74. IEEE, 2018) and MS1MV2 (http:// http://trillionpairs.deepglint.com/overview.). For evaluation, the performance of machine learning network 110 may be reported on most widely used datasets like LFW (Gary B Huang, Marwan Mattar, Tamara Berg, and Eric Learned-Miller. Labeled faces in the wild: A database for studying face recognition in unconstrained environments. 2008), YTF (Lior Wolf, Tal Hassner, and Itay Maoz. Face recognition in unconstrained videos with matched background similarity. IEEE, 2011) and CFP-FP (Soumyadip Sengupta, Jun-Cheng Chen, Carlos Castillo, Vishal M Patel, Rama Chellappa, and David W Jacobs. Frontal to profile face verification in the wild. In 2016 IEEE Winter Conference on Applications of Computer Vision (WACV), pages 1-9. IEEE, 2016). The performance of network 110 may be reported on more challenging datasets including large-age dataset CALFW (Tianyue Zheng, Weihong Deng, and Jiani Hu. Cross-age lfw: A database for studying cross-age face recognition in unconstrained environments. arXiv preprint arXiv: 1708.08197, 2017) and large-pose datasets CPLFW (Tianyue Zheng and Weihong Deng. Cross-pose lfw: A database for studying crosspose face recognition in unconstrained environments. Beijing University of Posts and Telecommunications, Tech. Rep, pages 18-01, 2018).

For prepossessing the first input image data 102-A and the second input image data 102-B, strategies adopted by most of the recent works in the field may be applied. Both for the training and test datasets, MTCNN (Kaipeng Zhang, Zhanpeng Zhang, Zhifeng Li, and Yu Qiao. Joint face detection and alignment using multitask cascaded convolutional networks. IEEE Signal Processing Letters, 23(10): 1499-1503, 2016) may be employed to generate normalized facial crops of size 160×160 with face alignment based on five facial points, for example. As a final step, the images 102-A, 102-B may be mean normalized and constrained in the range [−1, 1], for example. That is to say, the apparatus 100 may further comprise a preprocessor configured to preprocess the first and second input image data 102-A, 102-B for alignment of corresponding first and second images based on a plurality of predefined image points.

As explained before, network 110 may comprise two neural sub-networks, FeatureNet 112 and ModelNet 116. Pairs of face images 102-A, 102-B may be given as an input to FeatureNet 112, see FIG. 1, which may be based on a Siamese neural network. The architectural choice of FeatureNet 116 is crucial. In general, one may employ any state of-the-art neural network architecture able to learn good discriminative features. A goal of the FeatureNet 112 is to map the image space x onto a feature vector space $f_i \in \mathbb{R}^d$. A pair of feature vectors $f_1$ and $f_2$ may be concatenated resulting in $f=[f_1 f_2] \in \mathbb{R}^{2d}$. Different dimensionalities of the feature vectors $f_i$ have been explored. Thus, FeatureNet 112 may comprise a Siamese neural network configured to process the first and second image data 102-A, 102-B in tandem to compute the first and second discriminative image features $f_1$ and $f_2$. The resulting feature vector f obtained from FeatureNet 112 may be given as an input to subsequent ModelNet 116. In an example implementation, ModelNet 116 may comprise 7 Fully connected (FC) layers with the ReLU (rectified linear unit) activation function employed at the output of each layer. At the last layer, no activation function may be employed. The input size of ModelNet 116 is 2d, with the size gradually decreasing to the output size of latent space dimensionality m. A goal of this sub-network 116 is to map the feature vector f onto well-behaved distributions z in the latent space. Thus, ModelNet 116 may comprise a convolutional neural network comprising an input layer for the first and second discriminative image feature vectors $f_1$ and $f_2$, a plurality of fully connected layers to apply a previously trained metric on the first and second discriminative image feature vectors $f_1$ and $f_2$, and an output layer for an m-dimensional output. Also in this case, different dimensionalities m of the latent space have been explored.

For example, the network 110 may be trained using Adam optimizer (Diederik P Kingma and Jimmy Ba. Adam: A method for stochastic optimization. arXiv preprint arXiv: 1412.6980, 2014) using stochastic gradient descent. Each mini batch may be defined to be made of 720 people with each person having a minimum of 5 images to ensure enough matching and non-matching pairs. The initial learning rate may be set to be 0.1 with an exponential decay factor of 0.98 after every 5 epochs. In total, the network 110 may be trained for 500000 iterations. Weight decay may be set to be 2 exp −4. Further, a dropout with a keep probability value equal to 0.8 may be employed. All experiments may be implemented in TensorFlow (Martin Abadi, Paul Barham, Jianmin Chen, Zhifeng Chen, Andy Davis, Jeffrey Dean, Matthieu Devin, Sanjay Ghemawat, Geoffrey Irving, Michael Isard, et al. Tensorflow: A system for large-scale machine learning. In 12th {USENIX} Symposium on Operating Systems Design and Implementation ({OSDI}16), pages 265-283, 2016). Since a large number of positive and negative couples can be generated by a handful of data, a simple data augmentation strategy may be used by employing horizontal image flip.

Figure 4:
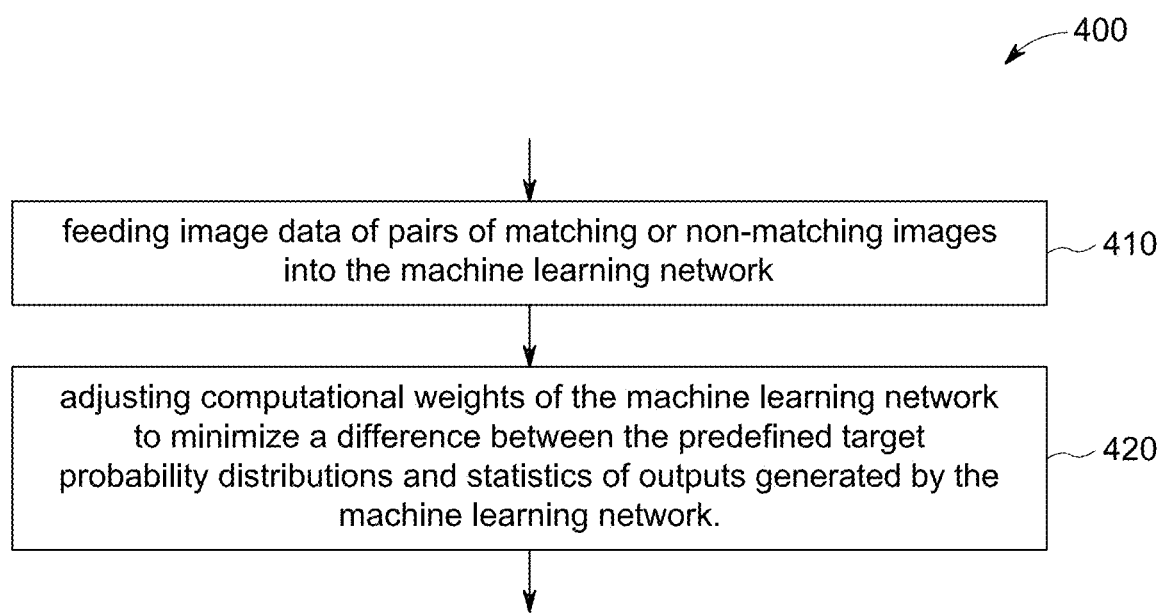
FIG. 4 shows a method for training an apparatus for image recognition according to embodiments of the present disclosure

A method 400 for training the apparatus 100 according to embodiments of the present disclosure is summarized in FIG. 4.

Method 400 includes feeding 410 image data 102-A, 102-B of pairs of matching or non-matching images into the machine learning network 110. Method 400 further includes adjusting 420 computational weights of the machine learning network 110 to minimize a difference between the predefined target probability distributions 120-A, 120-B and statistics of outputs 111 generated by the machine learning network 110.

Adjusting 420 the computational weights may comprise minimizing a difference between the first predefined target probability distribution 1120-A and a distribution of outputs 111 of the machine learning network 110 in response to pairs of matching images, and minimizing a difference between the second predefined target probability distribution 120-B and a distribution of outputs 111 of the machine learning network 110 in response to pairs of non-matching images. In some embodiments, adjusting 420 the computational weights may comprise minimizing the Kullback-Leibler divergence between the target probability distributions 120-A, 120-B and the statistics of outputs 111.

Figure 3:
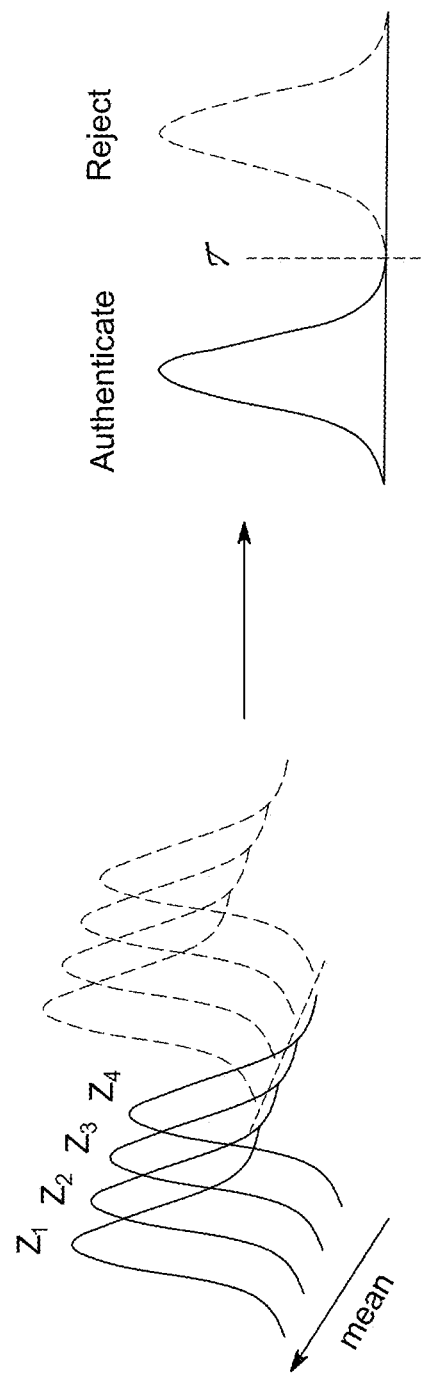
FIG. 3 shows latent vectors of an image pair and horizontal flips.

In the testing phase, a pair of images 102-A, 102-B may be passed through the network 110, and the latent space vectors of original images and flipped images may be calculated and a threshold may be applied for the authentication. In Table 1 below, the results of the single pair of images are reported as BioMetricNet-1. Further, we may take the mean of all four latent space vectors of the original and horizontally flips, these results are reported by BioMetricNet-M in Table 1 below. Once the latent space vector is obtained, a linear threshold may be applied for the authentication. The process is depicted in the FIG. 3.

As previously discussed, in the authorized and unauthorized target probability distributions 120-A, 120-B may be set to be Gaussian. This choice comes from the fact that the output of a (large enough) fully connected layer, by the central limit theorem, will naturally tend to a Gaussian distributed output. The distributions 120-A, 120-B may be set to be $\mathbb{P}_m = \mathcal{N}(0, 1)$ and $\mathbb{P}_n = \mathcal{N}(40, 1)$, for example. We may choose $\mu_{T_m} = 0$ and $\mu_{T_n} = 40$ to be different enough to keep the distributions far apart from each other.

Different dimensionalities of the feature vector were explored and a value of d=512 was selected since in example experiments this choice led to the highest accuracy. It was empirically found that a further increase in feature vector dimensionality leads to a statistically insignificant increase in performance taking more time for the training. However, the skilled person having benefit from the present disclosure will appreciate that other values of d may be appropriate for other applications.

Similar to the feature vector, for selecting optimal latent space dimensionality different dimensionalities of the latent vector were explored while fixing feature vector of size d=512. m=1 was selected as this choice leads to the highest accuracy and faster convergence. However, the skilled person having benefit from the present disclosure will appreciate that other values of m may be appropriate for other applications.

LFW and YTF are the most commonly used benchmarks for images and videos unconstrained face recognition. LFW consists of 13,233 face images collected from 5749 people. YTF dataset consists of 3,425 videos of 1595 people. For both the datasets, the results for 6000 pairs of testing images and videos are reported. For reporting the performance, the standard protocol was followed of unrestricted with labeled outside data.

TABLE 1

Verification performance % of different methods on LFW, YTF, CALFW, CPLFW and CFP

| Method | # Image | LFW | YTF | CALFW | CPLFW | CFP |
|---|---|---|---|---|---|---|
| SphereFace | 0.5M | 99.42 | 95.0 | 90.30 | 81.40 | 94.38 |
| SphereFace+ | 0.5M | 99.47 | — | — | — | — |
| FaceNet | 200M | 99.63 | 95.10 | — | — | — |
| VGGFace | 2.6M | 98.95 | 97.30 | 90.57 | 84.00 | — |
| DeepID | 0.2M | 99.47 | 93.20 | — | — | — |
| ArcFace | 5.8M | 99.82 | 98.02 | 95.45 | 92.08 | 98.37 |
| CenterLoss | 0.7M | 99.28 | 94.9 | 85.48 | 77.48 | — |
| DeepFace | 4.4M | 97.35 | 91.4 | — | — | — |
| Baidu | 1.3M | 99.13 | — | — | — | — |
| RangeLoss | 5M | 99.52 | 93.7 | — | — | — |
| MarginalLoss | 3.8M | 99.48 | 95.98 | — | — | — |
| CosFace | 5M | 99.73 | 97.6 | — | — | 95.44 |

TABLE 1-continued

Verification performance % of different methods on LFW, YTF, CALFW, CPLFW and CFP

| Method | # Image | LFW | YTF | CALFW | CPLFW | CFP |
|---|---|---|---|---|---|---|
| BioMetricNet-1 | 5.8M | 99.75 | 97.83 | 96.88 | 95.30 | 99.33 |
| BioMetricNet-M | 5.8M | 99.80 | 98.06 | 97.07 | 95.60 | 99.35 |

In Table 1 the verification performance in % is compared for different methods. As can be observed from the table, embodiments of the present disclosure (referred to as BioMetricNet) outperform the baseline methods (CosFace, ArcFace, and SphereFace) with a significant margin on YTF, CALFW, CPLFW, and CFP-FP. This shows the learning of regularized mappings onto latent space can enhance the discrimination ability of the network leading to higher accuracy.

The present disclosure presents a novel and innovative approach for unconstrained face recognition and authentication in which discriminative facial features are directly mapped to the regularized latent space which leads to improved robustness and accuracy. An intuition behind this behavior is that the nonlinear boundaries learned by standard deep learning classifiers indeed become very complex as they try to closely fit the training data, leaving room for misclassification. Conversely, embodiments of the present disclosure enable much simpler boundaries to be used as they does not learn how to partition the space but rather how to map the input space into the latent space. With extensive experiments, on multiple datasets with several state-of-the-art benchmark methods, it was shown that embodiments of the present disclosure can outperform other existing techniques.

Note that the present technology can also be configured as described below.

(1) An apparatus for image recognition, the apparatus comprising:
  a machine learning network configured to map first and second input image data to either a first or a second predefined target probability distribution, depending on whether the first and second input image data correspond to matching or non-matching images,
  wherein an output of the machine learning network matching the first target probability distribution is indicative of matching images and an output of the machine learning network matching the second target probability distribution is indicative of non-matching images.

(2) The apparatus of (1), wherein the first and the second target probability distribution correspond to a first and a second multivariate Gaussian distribution with distinct centers of mass.

(3) The apparatus of (1) or (2), wherein the machine learning network comprises
  a first machine learning subnetwork configured to extract respective discriminative image features from the first and second image data; and
  a second machine learning subnetwork configured to map the extracted first and second discriminative image features to one of the first and second predefined target probability distributions.

(4) The apparatus of (3), wherein the first machine learning subnetwork comprises a Siamese neural network configured to process the first and second image data in tandem to compute the first and second discriminative image features.

(5) The apparatus of (3) or (4), wherein the second machine learning subnetwork comprises a convolutional neural network comprising an input layer for the first and second discriminative image features, a plurality of fully connected layers to apply a previously trained metric on the first and second discriminative image features, and an output for an m-dimensional output.

(6) The apparatus of any one of (1) to (5), further comprising a preprocessor configured to preprocess the first and second input image data for alignment of corresponding first and second images based on a plurality of predefined image points.

(7) A method for training the apparatus of any one of (1) to (6), the method comprising:
feeding image data of pairs of matching or non-matching images into the machine learning network;
adjusting computational weights of the machine learning network to minimize a difference between the predefined target probability distributions and statistics of outputs generated by the machine learning network.

(8) The method of (7), wherein adjusting the computational weights comprises minimizing a difference between the first predefined target probability distribution and a distribution of outputs of the machine learning network in response to pairs of matching images, and minimizing a difference between the second predefined target probability distribution and a distribution of outputs of the machine learning network in response to pairs of non-matching images (9) The method of (7) or (8), wherein adjusting the computational weights comprises minimizing the Kullback-Leibler divergence between the target probability distributions and the statistics of outputs.

(10) A method for image recognition, the method comprising:
mapping, using a machine learning network, first and second input image data to either a first or a second predefined target probability distribution, depending on whether the first and second input image data correspond to matching or non-matching images;
deciding for matching images if an output of the machine learning network matches the first target probability distribution or deciding for non-matching images if the output of the machine learning network matches the second target probability distribution.

The aspects and features mentioned and described together with one or more of the previously detailed examples and figures, may as well be combined with one or more of the other examples in order to replace a like feature of the other example or in order to additionally introduce the feature to the other example.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a preprocessing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

Examples may further be or relate to a computer program having a program code for performing one or more of the above methods, when the computer program is executed on a computer or processor. Steps, operations or processes of various above-described methods may be performed by programmed computers or processors. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in a computer system may be a custom circuit, an applicationspecific integrated circuit (ASIC), or the like, such as, for example, one or more circuits (such as a communication circuit) for use in wireless devices like mobile telephones, tablet computers, laptop computers, two-way radios, and similar electronic systems. The computer system may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system may also include a display device, one or more speakers, and a keyboard and/or controller, which can include a mouse, trackball, touch screen, voice-recognition device, or any other device that permits a system user to input information into and receive information from the computer system.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a nontransitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine-readable carrier.

Other embodiments comprise the computer program for performing one of the methods described herein, stored on a machine-readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. An apparatus for image recognition, the apparatus comprising:
 a processor configured to
 map, by a machine learning network, first and second input image data to either a first or a second predefined target probability distribution, depending on whether the first and second input image data correspond to matching or non-matching images,
 wherein an output of the machine learning network matching the first target probability distribution is indicative of matching images and an output of the machine learning network matching the second target probability distribution is indicative of non-matching images,
 wherein the machine learning network comprises a first machine learning subnetwork configured to extract respective discriminative image features from the first and second image data, and a second machine learning subnetwork, wherein the second machine learning subnetwork is configured to transform concatenated features formed from concatenating the extracted first and second discriminative image features by mapping the concatenated features to one of the first and second predefined target probability distributions,
 wherein the first machine learning subnetwork comprises a Siamese neural network configured to process the first and second image data in tandem to compute the first and second discriminative image features, and
 select, within mini-batches during online training, from outputs of the machine learning network, a subset of matching pairs whose output is outside a predetermined distance threshold from a mass center of the first target probability distribution and a subset of non-matching pairs whose output is outside the predetermined distance threshold from a mass center of the second target probability distribution for use in subsequent training epochs, wherein the selection is performed after each training epoch to identify pairs from the machine learning network outputs for use in the subsequent training epoch.

2. The apparatus of claim 1, wherein the first and the second target probability distribution correspond to a first and a second multivariate Gaussian distribution with distinct centers of mass.

3. The apparatus of claim 1, wherein the second machine learning subnetwork comprises a convolutional neural network comprising an input layer for the first and second discriminative image features, a plurality of fully connected layers to apply a previously trained metric on the first and second discriminative image features, and an output for an m-dimensional output.

4. The apparatus of claim 1, further comprising a preprocessor configured to preprocess the first and second input image data for alignment of corresponding first and second images based on a plurality of predefined image points.

5. A method for training the apparatus of claim 1, the method comprising:
feeding image data of pairs of matching or non-matching images into the machine learning network;
adjusting computational weights of the machine learning network to minimize a difference between the predefined target probability distributions and statistics of outputs generated by the machine learning network.

6. The method of claim 5, wherein adjusting the computational weights comprises minimizing a difference between the first predefined target probability distribution and a distribution of outputs of the machine learning network in response to pairs of matching images, and minimizing a difference between the second predefined target probability distribution and a distribution of outputs of the machine learning network in response to pairs of non-matching images.

7. The method of claim 5, wherein adjusting the computational weights comprises minimizing the Kullback-Leibler divergence between the target probability distributions and the statistics of outputs.

8. A method for image recognition, the method comprising:
mapping, using a machine learning network, first and second input image data to either a first or a second predefined target probability distribution, depending on whether the first and second input image data correspond to matching or non-matching images;
deciding for matching images if an output of the machine learning network matches the first target probability distribution or deciding for non-matching images if the output of the machine learning network matches the second target probability distribution,
wherein the machine learning network comprises a first machine learning subnetwork configured to extract respective discriminative image features from the first and second image data, and a second machine learning subnetwork, wherein the second machine learning subnetwork is configured to transform concatenated features formed from concatenating the extracted first and second discriminative image features by mapping the concatenated features to one of the first and second predefined target probability distributions,
wherein the first machine learning subnetwork comprises a Siamese neural network configured to process the first and second image data in tandem to compute the first and second discriminative image features; and
selecting, within mini-batches during online training, from outputs of the machine learning network, a subset of matching pairs whose output is outside a predetermined distance threshold from a mass center of the first target probability distribution and a subset of non-matching pairs whose output is outside the predetermined distance threshold from a mass center of the second target probability distribution for use in subsequent training epochs, wherein the selection is performed after each training epoch to identify pairs from the machine learning network outputs for use in the subsequent training epoch.

* * * * *